United States Patent
Furukawa et al.

(10) Patent No.: US 11,577,595 B2
(45) Date of Patent: Feb. 14, 2023

(54) VEHICLE BODY REAR STRUCTURE OF ELECTRIC VEHICLE

(71) Applicants: TOYOTA JIDOSHA KABUSHIKI KAISHA, Aichi-ken (JP); SUBARU CORPORATION, Tokyo (JP)

(72) Inventors: Iwao Furukawa, Tokyo-to (JP); Ryotaro Takami, Okazaki (JP)

(73) Assignees: TOYOTA JIDOSHA KABUSHIKI KAISHA, Aichi-Ken (JP); SUBARU CORPORATION, Tokyo (JP)

( * ) Notice: Subject to any disclaimer, the term of this patent is extended or adjusted under 35 U.S.C. 154(b) by 191 days.

(21) Appl. No.: 17/120,266

(22) Filed: Dec. 14, 2020

(65) Prior Publication Data

US 2021/0213818 A1 Jul. 15, 2021

(30) Foreign Application Priority Data

Jan. 14, 2020 (JP) ............................. JP2020-003787

(51) Int. Cl.
*B60K 1/00* (2006.01)
*B62D 25/08* (2006.01)

(52) U.S. Cl.
CPC ............... *B60K 1/00* (2013.01); *B62D 25/08* (2013.01)

(58) Field of Classification Search
CPC .... B60K 2001/0416; B60K 2001/0438; B62D 21/15; B62D 21/152
See application file for complete search history.

(56) References Cited

U.S. PATENT DOCUMENTS

| | | | |
|---|---|---|---|
| 5,392,873 A | 2/1995 | Masuyama et al. | |
| 7,070,015 B2* | 7/2006 | Mathews | B60R 16/04 180/274 |
| 7,992,912 B2* | 8/2011 | Klotz | B60R 5/04 296/37.1 |
| 8,051,934 B2* | 11/2011 | Kiya | H01M 50/20 180/274 |
| 9,873,456 B2* | 1/2018 | Hara | B60K 1/04 |
| 9,963,028 B1* | 5/2018 | Pachore | B60K 1/04 |
| 10,005,350 B1* | 6/2018 | Khan | B60K 6/445 |
| 2002/0034430 A1* | 3/2002 | Sotiroff | B60N 2/3072 224/404 |

(Continued)

FOREIGN PATENT DOCUMENTS

| | | |
|---|---|---|
| JP | H5193376 A | 8/1993 |
| JP | 200874358 A | 4/2008 |

(Continued)

*Primary Examiner* — Jeffrey J Restifo
(74) *Attorney, Agent, or Firm* — Hauptman Ham, LLP

(57) ABSTRACT

A vehicle body rear structure of an electric vehicle may include: a high-voltage device arranged in a rear portion of the electric vehicle, wherein the high-voltage device is included in an electric powertrain of the electric vehicle or is electrically connected to the electric powertrain, and the high-voltage device is operable on a voltage over AC 30 or DC 60 volts; a low-voltage device arranged rearward of the high-voltage device at a same height level as the high-voltage device, wherein the low-voltage device is operable at a voltage lower than AC 30 or DC 60 volts; and a crossmember passing between the high-voltage device and the low-voltage device.

11 Claims, 3 Drawing Sheets

(56) References Cited

U.S. PATENT DOCUMENTS

| | | | | |
|---|---|---|---|---|
| 2004/0090085 | A1* | 5/2004 | Kawasaki | B60L 50/66 296/187.09 |
| 2007/0215399 | A1* | 9/2007 | Watanabe | B60K 1/04 180/68.5 |
| 2009/0226806 | A1* | 9/2009 | Kiya | B60R 16/04 429/186 |
| 2010/0101885 | A1* | 4/2010 | Nozaki | B60K 1/00 180/232 |
| 2012/0055724 | A1* | 3/2012 | Iwasa | B60L 53/11 180/68.5 |
| 2012/0255279 | A1 | 10/2012 | Atluri et al. | |
| 2013/0026786 | A1* | 1/2013 | Saeki | B60K 1/04 296/187.08 |
| 2013/0118823 | A1* | 5/2013 | Pohl | B62D 25/20 180/68.5 |
| 2016/0362018 | A1 | 12/2016 | Tanaka | |
| 2018/0147930 | A1* | 5/2018 | Sakaguchi | B60K 1/04 |
| 2018/0342718 | A1* | 11/2018 | Lacovoni | B60L 50/64 |
| 2019/0084508 | A1 | 3/2019 | Muramatsu et al. | |
| 2019/0275876 | A1* | 9/2019 | Fukui | B60K 1/04 |
| 2020/0148052 | A1* | 5/2020 | Matsuoka | B62D 21/09 |
| 2020/0231216 | A1* | 7/2020 | Choi | B62D 21/155 |
| 2021/0061081 | A1* | 3/2021 | Kodama | B62D 25/08 |
| 2021/0213818 | A1* | 7/2021 | Furukawa | B60K 1/00 |
| 2021/0300168 | A1* | 9/2021 | Kohara | B60K 1/04 |
| 2021/0300473 | A1* | 9/2021 | Kohara | B60K 1/04 |
| 2021/0300480 | A1* | 9/2021 | Kohara | B62D 25/20 |
| 2021/0320366 | A1* | 10/2021 | Hashimoto | B60K 1/04 |
| 2021/0331571 | A1* | 10/2021 | Itoh | B60L 3/003 |

FOREIGN PATENT DOCUMENTS

| | | |
|---|---|---|
| JP | 20116050 A | 1/2011 |
| JP | 20159588 A | 1/2015 |
| JP | 20174848 A | 1/2017 |
| JP | 201948640 A | 3/2019 |
| JP | 201951817 A | 4/2019 |

* cited by examiner

VEHICLE BODY REAR STRUCTURE OF ELECTRIC VEHICLE

CROSS-REFERENCE TO RELATED APPLICATION

This application claims priority to Japanese Patent Application No. 2020-003787 filed on Jan. 14, 2020, the contents of which are hereby incorporated by reference into the present application.

TECHNICAL FIELD

The technique disclosed herein relates to a vehicle body rear structure of an electric vehicle. Especially, the technique relates to a vehicle body rear structure in which a high-voltage device and a low-voltage device are arranged in a rear portion of an electric vehicle. The electric device herein refers to a vehicle including an electric traction motor. In other words, the electric vehicle herein includes a hybrid vehicle including both an electric traction motor and an engine, a fuel cell vehicle including a battery and a fuel cell as a power source for an electric traction motor, and a vehicle including a capacitor as a power source for an electric traction motor, and the like. The high-voltage device refers to an electric device which is defined in the Federal Motor Vehicle Safety Standards 305 (FMVSS305), and included in an electric powertrain or electrically connected to the electric powertrain, and of which operating voltage is over AC30[V] or DC60[V]. Further in this disclosure, an electric device of which operating voltage is lower than AC 30[V] or DC 60[V] is referred to as the low-voltage device.

Examples of the high-voltage device are a traction motor and an inverter which supplies alternating current power to the traction motor. Examples of the low-voltage device are a car audio, a navigation device, and a controller which provides instructions to an inverter.

BACKGROUND

A variety of electric devices are mounted in a modern electric vehicle. A plurality of electric devices may also be mounted in a rear portion of the electric vehicle. For example, a vehicle of Japanese Patent Application Publication No. 2011-006050 includes a charger mounted in a rear portion of the vehicle. A vehicle of Japanese Patent Application Publication No. 2015-009588 includes a battery, an inverter, and an electric fan mounted in a rear portion of the vehicle.

SUMMARY

A high-voltage device and a low-voltage device may be mounted in a rear portion of an electric vehicle. A technique which can protect the high-voltage device from coming into contact with the low-voltage device when an obstacle collides with the electric vehicle from a rear side of the electric vehicle is desired.

The present disclosure discloses a structure in which a high-voltage device and a low-voltage device are mounted in a rear portion of an electric vehicle. In a vehicle body rear structure disclosed herein, the low-voltage device may be arranged on a rear side of the vehicle relative to the high-voltage device at a same height level as the high-voltage device. Further, a crossmember may pass through between the high-voltage device and the low-voltage device. When an obstacle collides with the electric vehicle from the rear side thereof, the low-voltage device is pushed frontward by a collision load. However, the high-voltage device is protected by the crossmember, by which the high-voltage device can avoid coming into contact with the low-voltage device. The low-voltage device being arranged at the same height level as the high-voltage device means that the low-voltage device and the high-voltage device intersect with a same horizontal plane.

The details and further improvements of the technique disclosed herein will be described in DETAILED DESCRIPTION below.

DETAILED DESCRIPTION

Figure 1:
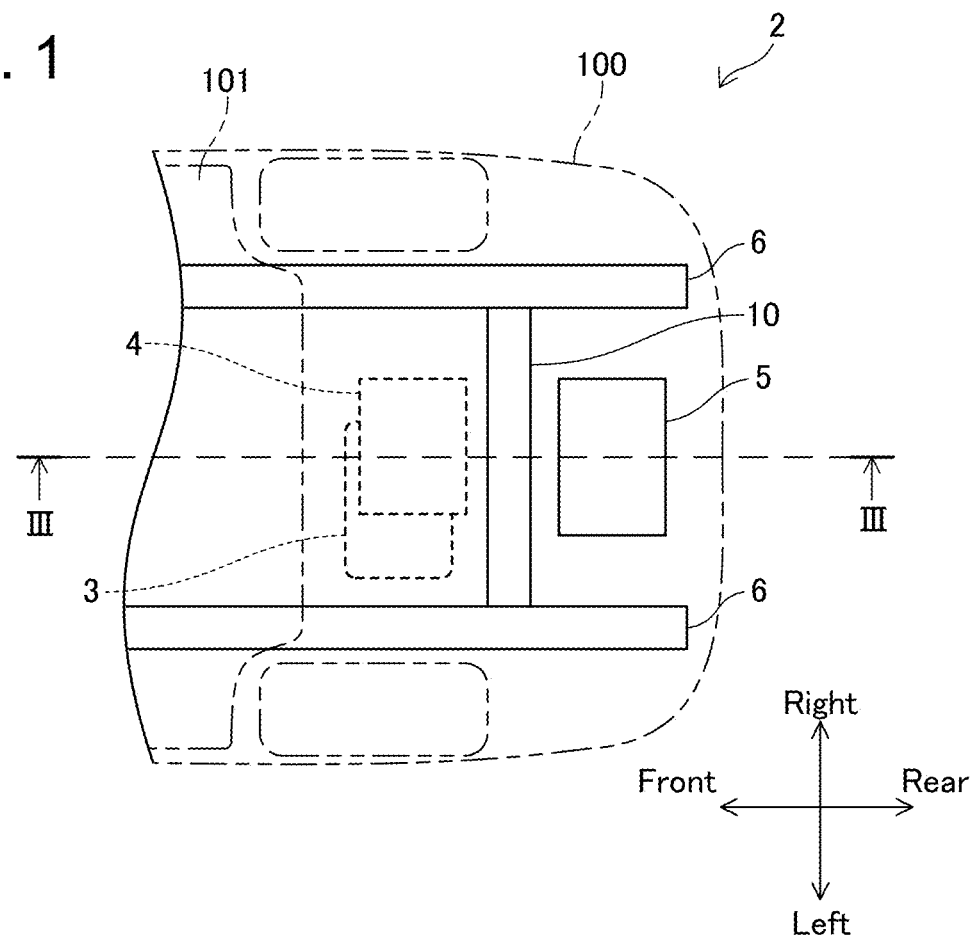
FIG. 1 shows a plan view of a rear portion of a vehicle.
Figure 2:
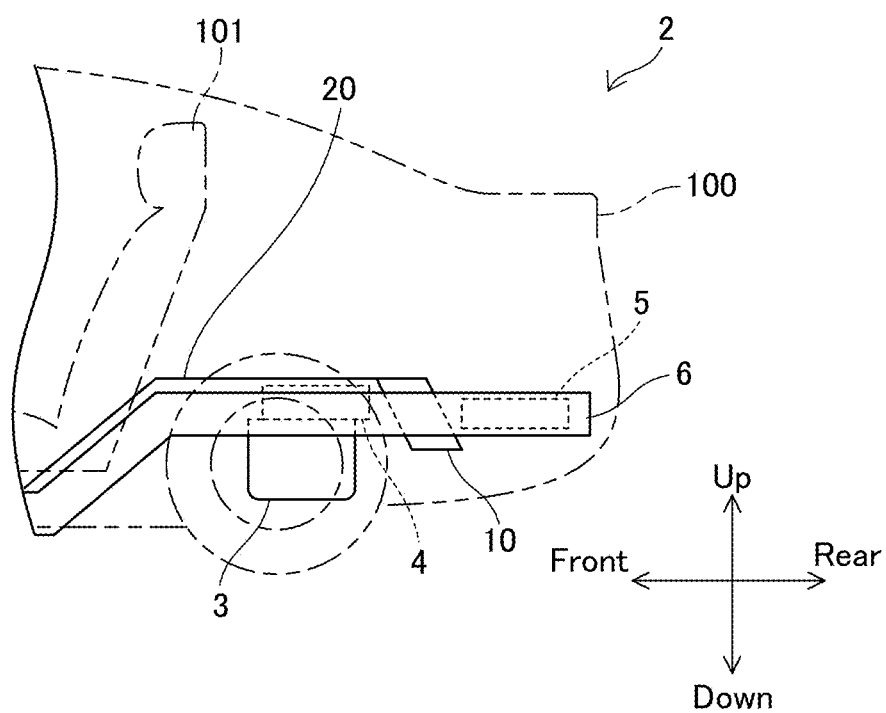
FIG. 2 show a side view of the rear portion of the vehicle.

A vehicle body rear structure 2 of the embodiment will be described with reference to drawings. FIG. 1 shows a plan view of a rear portion of a vehicle 100. FIG. 2 shows a side view of the rear portion of the vehicle 100. Terms "front", "rear", "right", "left" of a coordinate system of FIG. 1 are based on the vehicle. Terms "up" and "down" of a coordinate system of FIG. 2 are also based on the vehicle. In FIGS. 1 and 2, outlines of the vehicle 100 are illustrated in phantom lines such that an arrangement of main devices within the vehicle 100 can be seen.

The vehicle 100 of the embodiment is an electric vehicle including a rear motor 3 that drives rear wheels. Although not shown, the vehicle 100 also includes a front motor that drives front wheels. The rear motor 3 and an inverter 4 that supplies three-phase alternating current to the rear motor 3 are arranged in the rear portion of the vehicle. A controller 5 is also arranged in the rear portion of the vehicle. The rear portion of the vehicle herein refers to a portion rearward of a rear seat 101.

Output of the rear motor 3 is greater than or equal to 10 [kW], and the inverter 4 can supply electric power greater than or equal to 10 [kW] to the rear motor 3. Operating voltages of the rear motor 3 and the inverter 4 exceed AC 30[V]. The rear motor 3 is an electric device included in an electric powertrain, and the inverter 4 is an electric device electrically connected to the electric powertrain (the rear motor 3). In other words, the rear motor 3 and the inverter 4 are each classified as a high-voltage device.

On the other hand, the controller 5 is a device which provides commands to the inverter 4. Typically, the controller is a circuit of Transistor-Transistor Logic (TTL). Since an operating voltage of the controller 5 is less than 30 [V], the controller 5 is classified as a low-voltage device.

The rear motor 3, the inverter 4, and the controller 5 are arranged between a pair of rear side members 6 extending in a vehicle front-rear direction. The rear motor 3 and the inverter 4 are arranged frontward of a crossmember 10, and the controller 5 is arranged rearward of the crossmember 10.

The crossmember 10 extends in a vehicle right-left direction between the pair of the rear side members 6 and is connected to each of the pair of rear side members 6.

The rear motor 3 and the inverter 4 are arranged under a rear floor panel 20 (see FIG. 2). Thus, in FIG. 1, the rear motor 3 and the inverter 4 are illustrated in hidden lines.

Although details will be described below, a recess 21 is provided in the rear floor panel 20 rearward of the crossmember 10, and the controller 5 is arranged in the recess 21. The rear floor panel 20 corresponds to a floor of a trunk room of the vehicle 100.

Figure 3:
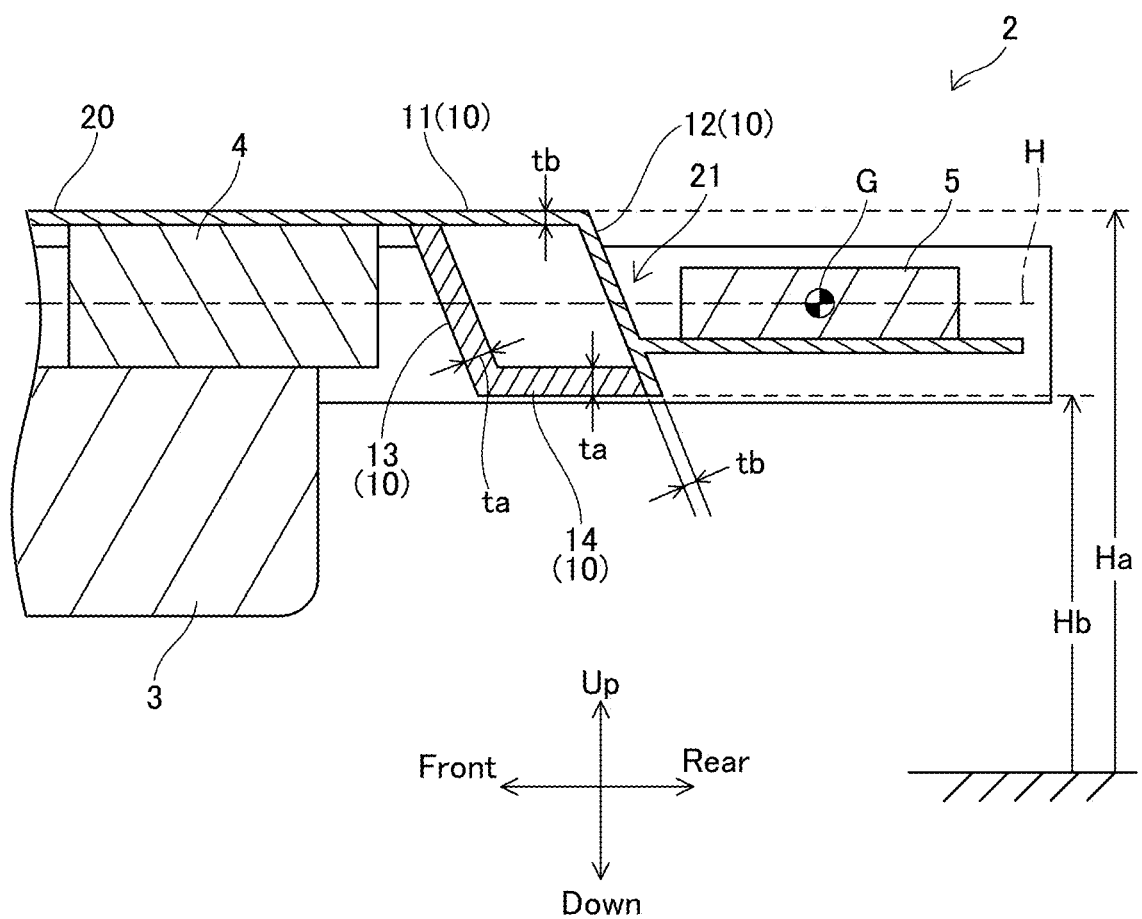
FIG. 3 shows a cross-sectional view taken along a line of FIG. 1.

FIG. 3 shows a cross-sectional view taken along a line III-III of FIG. 1. In FIG. 3, the illustration of the outlines of the vehicle 100 are omitted.

As described above, the rear motor 3 and the inverter 4 are arranged under the rear floor panel 20. The rear floor panel 20 includes the recess 21 rearward of the crossmember 10, and the controller 5 is arranged in the recess 21.

The crossmember 10 is a polygonal tube of which cross section is rectangular, and is comprised of an upper plate 11, a rear plate 12, a lower plate 14, and a front plate 13. The rear floor panel 20 serves as the upper plate 11 and the rear plate 12. The lower plate 14 and the front plate 13 are welded to the rear floor panel 20 (i.e., the upper plate 11 and the rear plate 12).

The inverter 4, the controller 5, and the crossmember 10 are positioned at the same height level. Here, "the same height level" means that each of the inverter 4, the controller 5, and the crossmember 10 intersects with the same horizontal plane (a straight-line H of FIG. 3). In other words, a part of the inverter 4, a part of the controller 5, and a part of the crossmember 10 are positioned at the same height level.

The crossmember 10 extends in the vehicle right-left direction and passes through between the inverter 4 and the controller 5. The inverter 4, the controller 5, and the crossmember 10 are positioned at the same height level. The crossmember 10 is a frame of the vehicle body, and has a high strength. The vehicle body rear structure 2 having these features provides following advantages.

When an obstacle collides with the vehicle from the rear side, the controller 5 rearward of the crossmember 10 is pushed frontward. The controller 5 is blocked by the crossmember 10, thus does not come into contact with the inverter 4. The inverter 4 which is the high-voltage device can avoid coming into contact with the controller 5.

The controller 5 is positioned lower than a height Ha of an upper surface of the crossmember 10. The controller 5 is positioned higher than a height Hb of a lower surface of the crossmember 10. Further, a center of gravity G of the controller 5 is positioned at the same height level as the crossmember 10. These structural features also contribute in protecting the inverter 4 from coming into contact with the controller 5 when the obstacle collides with the vehicle from the rear side.

A thickness ta of each of the front plate 13 and the lower plate 14 of the crossmember 10 is thicker than a thickness tb of each of the upper plate 11 and the rear plate 12 (i.e., the rear floor panel 20). Further, the front plate 13 and the rear plate 12 are inclined such that an upper end thereof is positioned forward of a lower end thereof. These structural characteristics also contribute in protecting the inverter 4 from coming into contact with the controller 5 when the obstacle collides the vehicle from the rear side.

Figure 4:
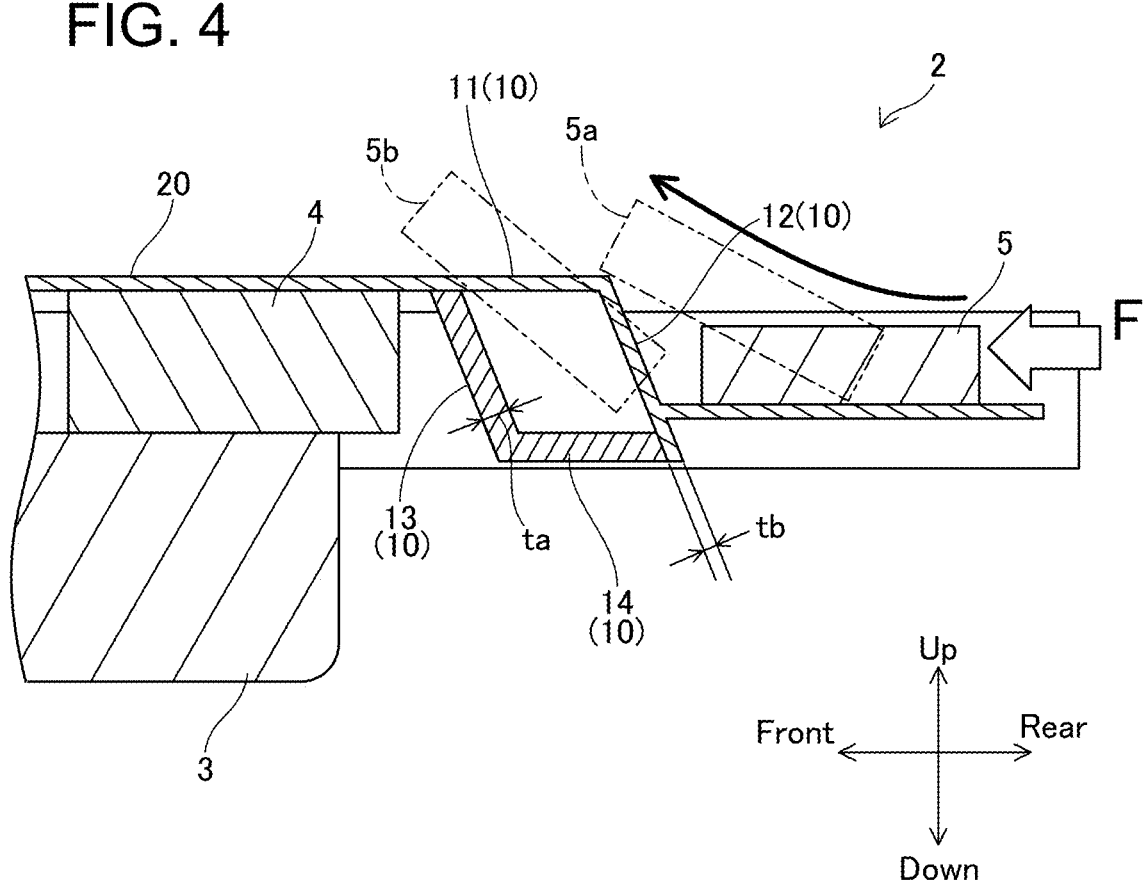
FIG. 4 shows a behavior of a controller when a collision load is applied to the vehicle from a rear side.

FIG. 4 shows a motion of the controller 5 when a collision load F is applied to the vehicle from the rear side. The rear plate 12 of the crossmember 10 is inclined. The controller 5 that has been pushed frontward by the collision load F moves frontward and upward along inclination of the rear plate 12, and avoids coming into contact with the inverter 4. A thick arrow line and a rectangle 5a in FIG. 4 shows the controller that has moved along the inclination of the rear plate 12.

When the collision load F is great, the rear plate 12 of the crossmember 10 may be distorted or crushed. In this case, the distortion or the crush of the rear plate 12 may reduce a momentum of moving controller 5. When the controller 5 moves frontward by breaking through the rear plate 12, then the front plate 13 having the greater thickness ta may stop the controller 5 from moving frontward. Even when the momentum of moving controller 5 is even stronger, the controller 5 moves frontward and upward along inclination of the front plate 13 and may avoid colliding with the inverter 4. A rectangle 5b in FIG. 4 shows the controller that has moved along the inclination of the front plate 13.

As described above, the vehicle body rear structure 2 of the embodiment protects the inverter 4 that is classified as the high-voltage device from coming into contact with the controller 5 that is classified as the low-voltage device when the obstacle collides with the vehicle from the rear side.

Notes regarding the technique described in the embodiment will be described. The high-voltage device arranged in the rear portion of the vehicle is not limited to the inverter 4. The low-voltage device arranged in the rear portion of the vehicle is not limited to the controller 5.

Specific examples of the present disclosure have been described in detail, however, these are mere exemplary indications and thus do not limit the scope of the claims. The art described in the claims include modifications and variations of the specific examples presented above. Technical features described in the description and the drawings may technically be useful alone or in various combinations, and are not limited to the combinations as originally claimed. Further, the art described in the description and the drawings may concurrently achieve a plurality of aims, and technical significance thereof resides in achieving any one of such aims.

What is claimed is:

1. A vehicle body rear structure of an electric vehicle, the vehicle body rear structure comprising:
    a high-voltage device arranged in a rear portion of the electric vehicle, wherein the high-voltage device is included in an electric powertrain of the electric vehicle or is electrically connected to the electric powertrain, and the high-voltage device is operable on a voltage over AC 30 or DC 60 volts;
    a low-voltage device arranged rearward of the high-voltage device at a same height level as the high-voltage device, wherein the low-voltage device is operable at a voltage lower than AC 30 or DC 60 volts; and
    a crossmember passing through between the high-voltage device and the low-voltage device, wherein
    the crossmember is a polygonal tube including an upper plate, a lower plate, a front plate, and a rear plate, and each of the lower plate and the front plate is thicker than the upper plate and the rear plate.

2. The vehicle body rear structure of claim 1, wherein the crossmember is connected to a pair of rear side members extending in a vehicle front-rear direction between the rear side members.

3. The vehicle body rear structure of claim 1, wherein the low-voltage device is positioned lower than an upper surface of the crossmember.

4. The vehicle body rear structure of claim 1, wherein the low-voltage device is positioned higher than a lower surface of the crossmember.

5. The vehicle body rear structure of claim 1, wherein a center of gravity of the low-voltage device is positioned at a same height level as the crossmember.

6. The vehicle body rear structure of claim 1, wherein
the front plate is inclined such that an upper end of the front plate is positioned forward of a lower end of the front plate, and
the rear plate is inclined such that an upper end of the rear plate is positioned forward of a lower end of the rear plate.

7. A vehicle body rear structure of an electric vehicle, the vehicle body rear structure comprising:
a high-voltage device arranged in a rear portion of the electric vehicle, wherein the high-voltage device is included in an electric powertrain of the electric vehicle or is electrically connected to the electric powertrain, and the high-voltage device is operable on a voltage over AC 30 or DC 60 volts;
a low-voltage device arranged rearward of the high-voltage device at a same height level as the high-voltage device, wherein the low-voltage device is operable at a voltage lower than AC 30 or DC 60 volts; and
a crossmember passing through between the high-voltage device and the low-voltage device, wherein
the crossmember is a polygonal tube including an upper plate, a lower plate, a front plate, and a rear plate,
the front plate is inclined such that an upper end of the front plate is positioned forward of a lower end of the front plate, and
the rear plate is inclined such that an upper end of the rear plate is positioned forward of a lower end of the rear plate.

8. The vehicle body rear structure of claim 7, wherein the crossmember is connected to a pair of rear side members extending in a vehicle front-rear direction between the rear side members.

9. The vehicle body rear structure of claim 7, wherein the low-voltage device is positioned lower than an upper surface of the crossmember.

10. The vehicle body rear structure of claim 7, wherein the low-voltage device is positioned higher than a lower surface of the crossmember.

11. The vehicle body rear structure of claim 7, wherein a center of gravity of the low-voltage device is positioned at a same height level as the crossmember.

\* \* \* \* \*